3,335,143
PERFLUOROTRIETHYLENEDIAMINE

William E. Erner, Allentown, Pa., assignor to Air Products and Chemicals, Inc., Philadelphia, Pa., a corporation of Delaware
No Drawing. Filed Jan. 10, 1966, Ser. No. 519,447
1 Claim. (Cl. 260—268)

The present invention relates to fluorine substituted triethylenediamine and more particularly, to perfluorotriethylenediamine ($C_6F_{12}N_2$—MW328) having the following structure:

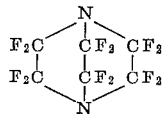

The tertiary amine, triethylenediamine, employed as a starting material for the preparation of perfluorotriethylenediamine is a heterocyclic cage compound in which the two nitrogens are joined by three ethylene groups. The preparation of this tertiary amine, which is sometimes designated as 1,4-diazabicyclo(2.2.2)octane, is well established in the art, being described in such U.S. Letters Patents as U.S. 2,937,176, U.S. 2,977,363, U.S. 2,977,364 and U.S. 2,985,658.

It has now been discovered that the novel compound perfluorotriethylenediamine can be prepared from triethylenediamine for use as a germicide, a cleaning agent and for other purposes. A particularly interesting application for perfluorotriethylenediamine is in the polymerization of this material for the preparation of high melting polymers and fibers.

The formation of perfluorotriethylenediamine can be most readily accomplished in a Simons' cell. Briefly, the Simons' cell process, which in itself does not form part of the present invention, involves electrolyzing a liquid hydrogen fluoride solution of a hydrogen-containing compound, resulting in the formation of a fluorinated product compound which can be readily separated and purified.

A simple type electrolytic cell comprises a nickel anode and an iron cathode. An iron or steel container can be used, which may be employed as a cathode, with a cover of iron or steel which is bolted in place. Anode and cathode plates, in alternating array can be suspended from the cover. Polytetrafluoroethylene is a suitable gasket and insulating material for electrode mountings and leads. Usually, an upper outlet for gaseous products, an upper inlet for charging materials and a bottom outlet for liquid products, is provided. Cooling may be provided by a jacket surrounding the cell for maintaining a desired operating temperature.

Commercial anhydrous liquid hydrogen fluoride can be used. This normally contains a trace of water, but water need not be present and highly anhydrous hydrogen fluoride can be used. The starting compounds are soluble in the liquid hydrogen fluoride and provide adequate electrolytic conductivity.

Cell potentials of between 4 to 8 volts D.C. have been found to be suitable. A current density of 20 or more amperes per square foot of anode surface can readily be obtained. Voltages sufficiently high to result in the formation of free fluorine are avoided.

A preferred operating pressure is atmospheric pressure and a preferred operating temperature is about 0° C.; but higher and lower operating pressures and temperatures can be employed.

Gaseous and volatile liquid product compounds can be withdrawn with and separated from gaseous mixture evolved from the cell. Non-volatilized product compounds separate as a constituent of a liquid which is immiscible with the electrolyte and settles to the bottom of the cell from which the liquid is withdrawn. The constituent components of the gaseous and liquid mixtures can be separated by fractional distillation.

The invention can be clarified by reference to the following example.

Example

A Simons'-type electrolytic cell of one gallon capacity and 4.25 square feet of anode surface, is charged with anhydrous hydrofluoric acid. A current of 20 amperes at 7 volts E.M.F. is passed for 48 hours. At the end of this time, the amperage is 8 and the production of $OF_2$ decreases to a trace.

112 grams (1 mole) of research-grade triethylenediamine is then introduced to the cell as a solution in perfluorohexane. Electrolysis is conducted at 20 to 24 amperes at 7 volts E.M.F. for 80 hours at the end of which time, the amperage is below 10. Thereafter, a fresh charge of 112 grams of triethylenediamine is introduced in perfluorohexane and the electrolysis proceeds as before. The cell charge is circulated for 15 minutes every 8 hours to insure good contact. After 90 hours, the perfluoro chemical layer is drained and agitated with powdered potassium fluoride for 4 hours.

Following distillation of the solvent, perfluorohexane, and low boiling material, a fraction is obtained which solidifies. This latter material is recrystallized from perfluorohexane to obtain perfluorotriethylenediamine having a melting point in excess of 120° C. and a tendency to sublime on heating.

Obviously, many modifications and variations of the invention as hereinbefore set forth may be made without departing from the spirit and scope thereof, and therefore only such limitations should be imposed as are indicated in the appended claim.

What is claimed is:

The chemical compound corresponding to the formula $N(CF_2CF_2)_3N$ and designated as perfluorotriethylenediamine.

References Cited

UNITED STATES PATENTS 2,964,526   12/1960   Herrick _____ 260—268

ALEX MAZEL, *Primary Examiner.*

HENRY R. JILES, *Examiner.*

R. BOYD, *Assistant Examiner.*